Nov. 1, 1966  T. G. PETERSON  3,282,621
COMBINATION LIFTING PALLET AND COLLAPSIBLE STORAGE
AND SHIPPING CONTAINER
Filed Dec. 26, 1963  2 Sheets-Sheet 2

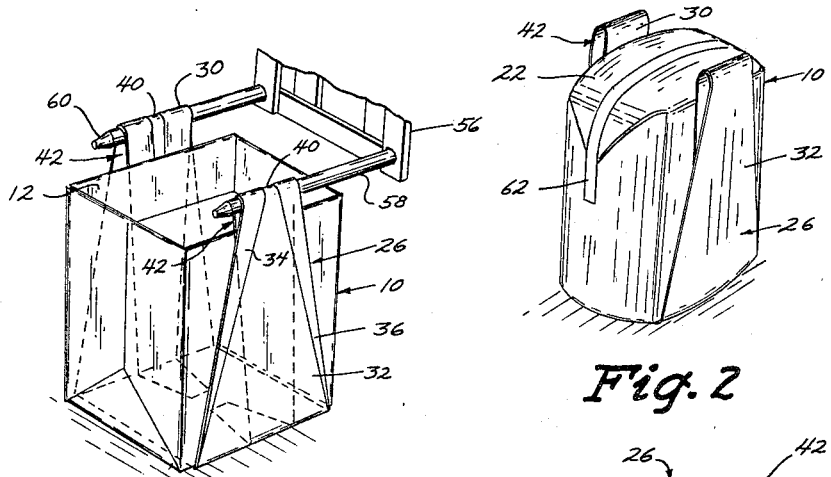
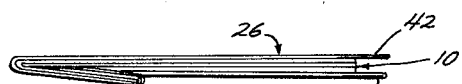
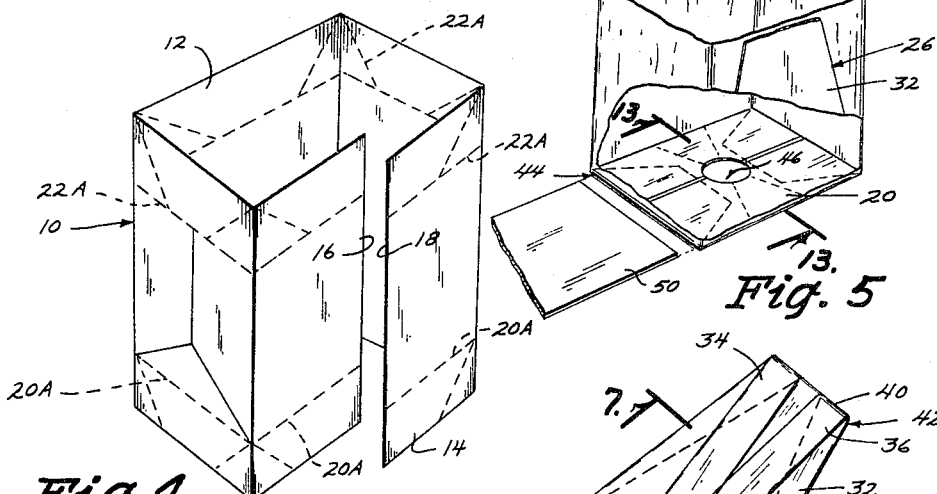
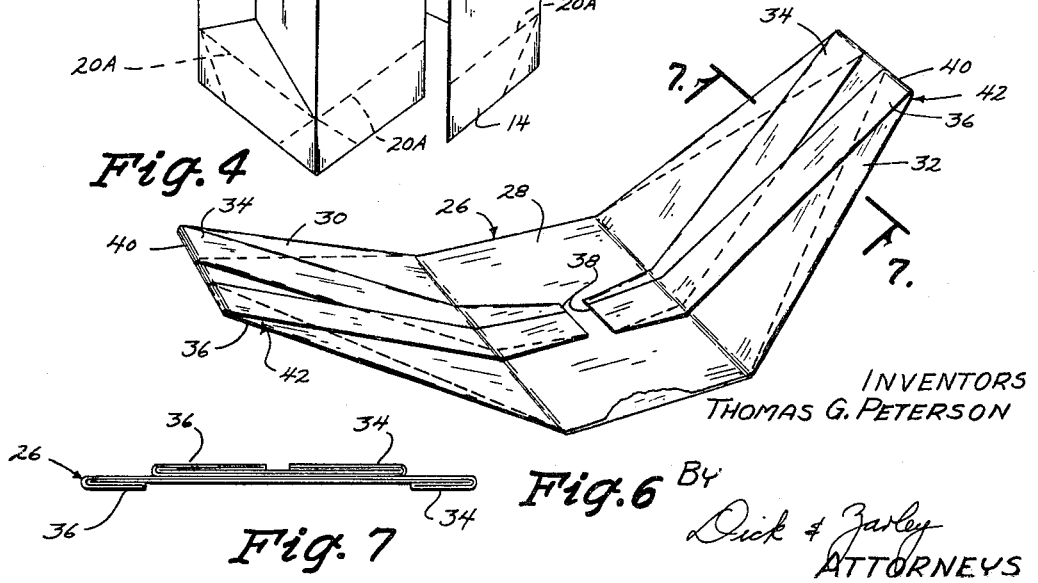

INVENTORS
THOMAS G. PETERSON

BY Dick & Zarley
ATTORNEYS

United States Patent Office 3,282,621
Patented Nov. 1, 1966

3,282,621
COMBINATION LIFTING PALLET AND COLLAPSIBLE STORAGE AND SHIPPING CONTAINER
Thomas G. Peterson, 1614 SW. Evans,
Des Moines, Iowa
Filed Dec. 26, 1963, Ser. No. 333,761
8 Claims. (Cl. 294—67)

Particular difficulty is encountered in shipping and storing powdered or granular materials and similar problems are encountered even in the storage and shipping of fluid materials. The granular materials must either be transferred from a storage container to a shipping container and thence back to a storage container after transportation, or they must be originally placed in a shipping container and kept there throughout storage and shipping until the time of use. Fluid chemicals and the like are also often handled in this same way.

The difficulty encountered by such storage and shipping containers involves the handling thereof as they are being deposited on and removed from the transportation device. Usually, cumbersome pallets or the like are used to facilitate the loading and unloading of these containers by conventional lifting apparatus. These containers many times do not economically and efficiently utilize the shipping or storage space and often consume valuable space when in an empty condition. Furthermore, they are either a permanent or disposable construction but cannot be easily adapted for both uses. These containers are usually designed to carry a specific load and cannot be reinforced to carry an increased load.

Therefore, a principal object of this invention is to provide a combination lifting pallet and container which can be easily picked up and moved about from place to place by conventional lifting apparatus.

A further object of this invention is to provide a combination lifting pallet and container which can be easily folded into a compact size when not in use.

A further object of this invention is to provide a combination lifting pallet and container which is exceedingly strong.

A still further object of this invention is to provide a combination lifting pallet and container which can either be reused or which, because of its economical cost, can be easily disposed of after use.

A still further object of this invention is to provide a combination lifting pallet and container which can be easily sealed.

A still further object of this invention is to provide a combination lifting pallet and container which can be easily reinforced for heavy loads.

A still further object of this invention is to provide a combination lifting pallet and container which can be easily made completely impervious to moisture.

A still further object of this invention is to provide a combination lifting pallet and container which is comprised of expansible material so that when loaded, it can efficiently consume storage and shipping areas.

A further object of this invention is to provide a combination lifting pallet and container which is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more full set forth, specifically pointed out in our claims, and illustrated in the accompanying drawings, in which:

FIGURE 1 is a perspective view of an empty container of this invention as it is being picked up by conventional lifting apparatus;

FIGURE 2 is a perspective view of a filled and sealed container of this invention but having an alternate design;

FIGURE 3 is a side elevational view of the container of this invention in a collapsed and empty condition;

FIGURE 4 is a perspective view of one of the sheet elements in the container during one stage of its fabrication;

FIGURE 5 is a partial perspective view of the container of this invention with portions thereof cut away to more fully illustrate its construction;

FIGURE 6 is a perspective view of a second sheet used in the container of this invention in one stage of its fabrication;

FIGURE 7 is a sectional view of the second sheet used in the container of this invention taken on line 7—7 of FIGURE 6;

Figure 10:
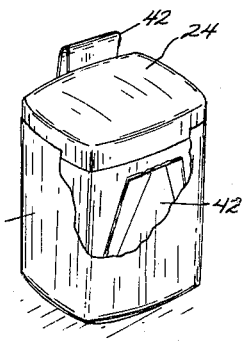
FIGURE 10 is a perspective view of an alternate form of container wherein the cap element thereof is a separate element.

The numeral 10 designates a first sheet of material used in the container of this invention and sheet 10 is best illustrated in FIGURE 4. This sheet is shown as being comprised of a single ply or layer but it is understood that sheet 10 could be comprised of two or three layers without changing the scope of this invention. Sheet 10 is a reinforced laminated craft sheet of either asphalt latex or polyethylene construction. A characteristic of this material is that, while being very durable, it is expansible and does have limited elastic characteristics. The container constructed from sheet 10, which will be described in more detail hereinafter, is capable of expanding in volume approximately 20 percent when it is filled. Thus, the filled volume of a container in FIGURE 2 is substantially 20 percent greater than the enmpty volume of the container in FIGURE 1. Sheet 10 includes a top portion 12, a bottom portion 14, and end edges 16 and 18. As best illustrated in FIGURES 1 and 4, the end edges 16 and 18 can be placed in overlapping condition, and can be secured in this position by a suitable adhesive. A container bottom 20 (FIGURE 5) is comprised by folding the bottom portion 14 upon itself, such as by utilizing the fold lines 20a as depicted in FIGURE 4. Obviously, the precise fold lines used in creating the container bottom 20 are not critical except as hereinafter noted. Similarly, a container top 22 (FIGURE 2) can be created by utilizing fold lines such as lines 22a which are indicated in FIGURE 4. Again the precise fold lines used are not critical and could assume a variety of patterns. When the top portion 12 of the sheet 10 is not folded to create a container top 22, a separate cap 24 can be fabricated and can be positioned over the top of the container as indicated in FIGURE 10.

A second sheet 26 is best illustrated in FIGURE 6. Sheet 26 is preferably identical in material to sheet 10.

This second sheet has been shown to be of two-ply construction, although the layers thereof can be varied as desired, as with sheet 10. Sheet 26 includes a center portion 28 and end portions 30 and 32. Each end portion 30 and 32 has oppositely disposed flaps 34 and 36 which are folded progressively and diagonally inwardly from a point beginning at the center portion 28 and extending to the inner ends 38. The flaps 34 and 36 are held in their folded condition by applying a suitable adhesive to the overlapping layers thereof.

After the end portions 30 and 32 of sheet 28 have been folded in the manner described above, and the flaps 34 and 36 have been secured in place by a suitable adhesive, the end portions are folded at 40 and doubled over upon themselves as illustrated in FIGURE 6. These folds present loops 42 which will be used as described hereafter. In the assembled container, loops 42 extend above the top of the container to protect the container from the lifting apparatus. Again, the loops 42 are maintained by applying adhesive to the overlapping folded portions of the sheet 26 except in the areas of loops 42. The extreme inner ends 38 of the end portions 30 and 32 are preferably secured by adhesive to the center portion 28.

The size and shape of the center portion 28 of sheet 26 is substantially the same as the size and shape of the container bottom 20 as formed in sheet 10. The container bottom 20 of sheet 10 is positioned on top of the center portion 28 of sheet 26 and the end portions 30 and 32 of sheet 26 are folded upwardly and are secured by a suitable adhesive to the outer side walls of the container formed by the sheet 10. Normally, no adhesive is used between the container bottom 20 and the center portion 28 of sheet 26 and it is preferred that a recessed passageway 44 (FIGURE 13) be formed therebetween. A circular discharge opening 46 can be precut into container bottom 20 and a registering discharge opening 48 can be similarly cut in the center portion 28 of sheet 26. A rectangular baffle plate 50 of paper, metal, or plastic construction can be slidably inserted into the recessed passageway 44 for a purpose to be described hereafter.

Figure 14:
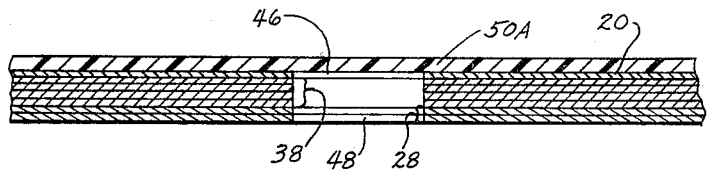
FIGURE 14 is a sectional view similar to that of FIGURE 13 but shows an alternate form of construction at the bottom of the container.

A container bottom is illustrated in FIGURE 14 which does not utilize the recessed passageway 44. In FIGURE 14, the container bottom 20 is in direct engagement with the center portion 28 of sheet 26 and the baffle plate 50a rests on top of the upper surface of the container bottom 20.

Figure 8:
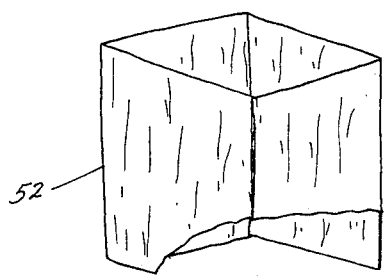
FIGURE 8 is a partial perspective view of a liner element which can be used in or outside the container of this invention.
Figure 9:
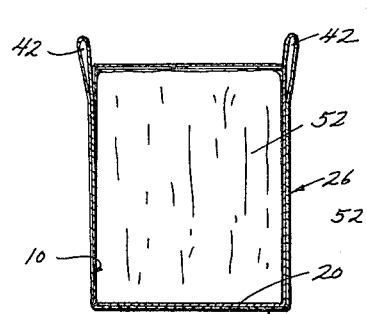
FIGURE 9 is a vertical sectional view taken through a container of this invention wherein the liner of FIGURE 8 is mounted therein.

A flexible liner element 52 is shown in FIGURES 8 and 9. This liner element is preferably of the same material as sheets 10 and 26 and can be made to assume its rectangular construction in the same manner that sheet 10 assumed this shape. It will be noted that liner 52 is open at both its upper and lower ends. Liner 52 is adapted to be inserted into the compartment formed by the folded sheet 10 (FIG. 9) to serve to reinforce the side walls of the container when unusually heavy loads are imposed on the container. In FIGURE 10, the "liner" 52 has been placed on the outside of the container with the lower edge of cap 24 being tucked inside its upper periphery.

Figure 11:
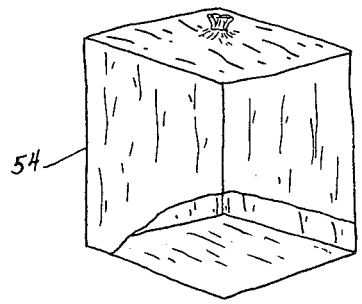
FIGURE 11 is a perspective view of a moisture impervious bag which can be inserted into the container of this invention.
Figure 12:
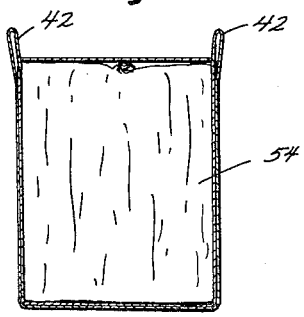
FIGURE 12 is a vertical sectional view taken through the container of this invention wherein the bag of FIGURE 11 is inserted therein.

A flexible moisture impervious bag 54 is shown in FIGURES 11 and 12. Bag 54 is comprised of any convenient moisture resistant material such as plastic or the like. It should have a volume equal to or greater than the internal volume of the container as formed by the folded sheet 10.

The folded condition of a container created by uniting the sheets 10 and 26 in the manner described above is shown in FIGURE 3. It should be noted that it is not absolutely essential that the discharge openings 46 and 48 be created before the container is filled with material, for in some uses, it is desirable to have the bottom of the container of continuous construction as generally depicted in FIGURES 9 and 12. If the container bottom is not of continuous construction, but assumes the design of FIGURE 13 or 14, the baffle plates 50 or 50a are positioned as described to close off the discharge openings prior to the time that material is placed within the container.

After the container has been filled with the desired material, the top portion 12 of sheet 10 can be folded in the manner described to form a container top 22. The container top 22 can be sealed in a closed condition by utilizing any convenient sealing tape 62 as depicted in FIGURE 2. If the top portion 12 of the sheet 10 is not so folded to create the container top 22, the prefabricated cap 24 can be placed over the top of the resulting container and can be temporarily held in place and sealed to the container by any convenient tape or the like.

A lifting machine with horizontal parallel spaced apart arms 58 with tapered outer ends 60 is adapted to move towards the filled container so that the arms 58 can penetrate the open loops 42 of the container. The container can then be lifted and moved to any desired position such as within a transportation unit. Because the material of the container is somewhat elastic, the container will expand to hold a greater volume than the empty volume of the unit. Since loops 42 are flexible and extend above the top of the unit, they can be moved to receive the arms 58 of loader 56, even if the expansion of the unit has "spread" the normal position of the loops away from the arms 58. The arms 58 are removed from the loops 42 by merely reversing the above described process whereby the container was originally lifted. When the container is transported, such as by railroad car or the like, it can be subsequently removed from the transporting unit by a similar lifting apparatus 56.

If it is desired to increase the strength of the side walls of the container, the liner 52 can be inserted within the container before the material or, as shown in FIGURE 10, liner 52 can be placed on the outside of the container.

When it is desired to protect the material within the container from the effects of moisture, the bag 54 can be placed within the container and the top thereof can be sealed by any convenient manner after the material has been placed within the bag.

When it is desired to remove the contents from the container, the procedure involved will be dictated by the precise construction of the bottom of the container. If the bottom of the container is of continuous construction, as illustrated in FIGURES 9 and 12, the bottom or side of the container can be cut or punctured as the container is held in an elevated position to permit the contents of the container to move therefrom by gravity. Usually, a bag so punctured would be thrown away after the contents were removed therefrom.

When a container utilizing the bottom construction shown in FIGURE 14 was being emptied, the baffle plate 50a would be punctured at a point just above the registering discharge openings 46 and 48 to permit the contents of the container to flow through these discharge openings. In such a case, the baffle plate 50a would normally be comprised of a heavy paper or the like. Again, the use of the discharge openings 46 or 48 presupposes that the container is being held in an elevated position or that the container is supported on a pallet having a centrally located discharge opening. Such a container could be reused after opening by merely replacing the baffle plate 50a.

Figure 13:
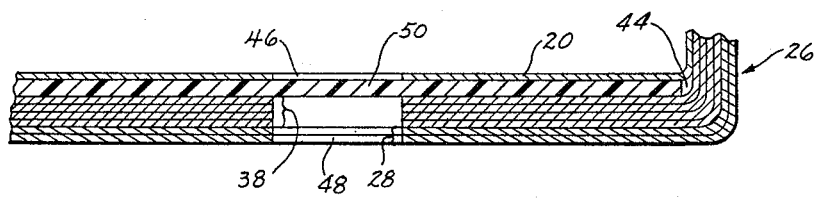
FIGURE 13 is a partial sectional view of the bottom of a container of this invention as taken on line 13—13 of FIGURE 5.

To empty the container shown in FIGURES 5 and 13, the baffle plate 50 is merely removed from the recessed passageway 44 and the material will flow by gravity through the discharge openings 46 and 48. These containers could be reused by merely reinserting the baffle plate 50 into the recessed passageway after the containers were emptied.

Therefore, from the above, it is seen that the described container will accomplish at least all of its stated objectives.

Some changes may be made in the construction and arrangement of my Combination Lifting Pallet and Collapsible Storage and Shipping Container without departing from the real spirit and purpose of my invention, and it is my intention to cover by my claims, any modified forms of structure or use of mechanical equivalents which may be reasonably included within their scope.

I claim:
1. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
a recessed passageway between the container bottom and the center portion of said second sheet means, said container bottom and said center portion of said second sheet means having registering discharge openings,
and a baffle element removably extending into said passageway.

2. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
said second sheet being at least partially folded upon itself in a lateral direction to increase its strength.

3. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
said container bottom and said second sheet means each having a discharge opening in registering positions.

4. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
said container bottom and said second sheet means each having a discharge opening in registering positions,
and a baffle element positioned on the upper surface of said container bottom.

5. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means, and the end portions of said second sheet terminating underneath said container bottom.

6. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
the center portion of said second sheet means having an area substantially the same as that of said container bottom.

7. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions, the center portion of said second sheet being positioned underneath said container bottom,
the end portions of said second sheet means being folded upon themselves to form loop portions,
said loop portions being secured to said first sheet means,
the center portion of said second sheet means having an area substantially the same as that of said container bottom,
the end portions of said second sheet means being folded laterally and diagonally inwardly so that at least part of the uppermost portions of said loop portions have a thickness twice that of said center portion.

8. In a storage and shipping container,
a first sheet means of continuous unitary construction,
said sheet means including top, bottom and two end edge portions,
said end edge portions being secured together in overlapping condition,
said bottom portion being folded upon itself to form a container bottom,
a second sheet means of continuous unitary construction,
said second sheet means including a center portion and two end portions,
the center portion of said second sheet being positioned underneath said container bottom,
the end portions of said second sheet means being folded upon themselves to form loop portions,
said loop portions being secured to said first sheet means,
the center portion of said second sheet means having an area substantially the same as that of said container bottom,
the end portions of said second sheet means being folded laterally and diagonally inwardly so that at least part of the uppermost portions of said loop portions have a thickness twice that of said center portions, and the ends of said end portions having a thickness four times that of said center portion.

References Cited by the Examiner

UNITED STATES PATENTS

| | | |
|---|---|---|
| 1,735,915 | 11/1929 | Bent. |
| 2,861,718 | 11/1958 | Winzen. |
| 2,998,181 | 8/1961 | Chasolen. |

FOREIGN PATENTS

| | | |
|---|---|---|
| 229,822 | 7/1960 | Australia. |

MARVIN A. CHAMPION, *Primary Examiner.*

GERALD M. FORLENZA, *Examiner.*

G. F. ABRAHAM, *Assistant Examiner.*